Figure 1:
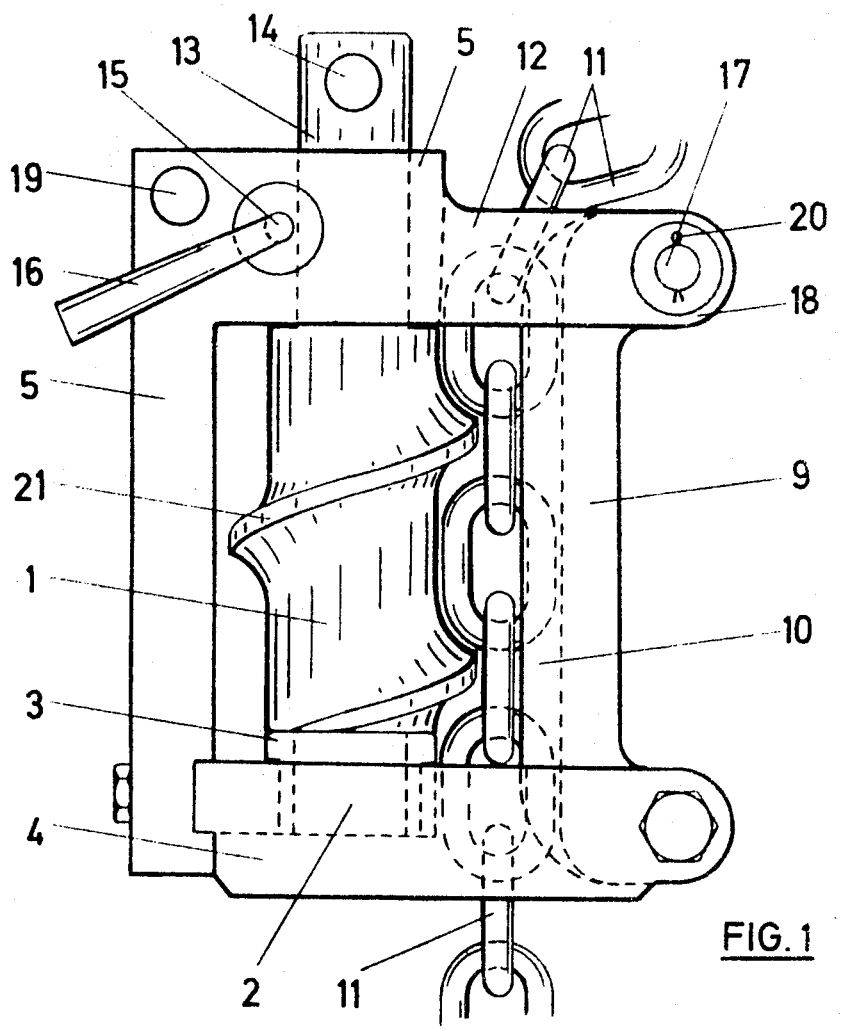

United States Patent

[11] 3,611,825

| [72] | Inventor | Elis Kallaes<br>Orsa, Sweden |
|---|---|---|
| [21] | Appl. No. | 873,420 |
| [22] | Filed | Nov. 3, 1969 |
| [45] | Patented | Oct. 12, 1971 |
| [73] | Assignee | Seasafe Transport AB<br>Stockholm, Sweden |
| [32] | Priority | Nov. 5, 1968 |
| [33] | | Sweden |
| [31] | | 15598/68 |

[54] DRIVING DEVICE FOR CHAINS
5 Claims, 2 Drawing Figs.

[52] U.S. Cl. .................................... 74/424.7,
74/37, 254/170
[51] Int. Cl. .................................... F16h 1/18,
F16h 19/06, B66d 3/08
[50] Field of Search........................................ 74/424.7,
424.6, 424.5, 25, 37; 254/98, 170

[56] References Cited
UNITED STATES PATENTS

| 198,416 | 12/1877 | Sanford | 74/424.6 |
| 393,541 | 11/1888 | Cornelius | 74/424.7 |
| 594,511 | 11/1897 | Auble | 74/424.6 |
| 596,618 | 1/1898 | Redmon | 74/424.7 |
| 3,402,618 | 9/1968 | Roantree | 74/424.7 |

FOREIGN PATENTS

| 579,621 | 8/1946 | Great Britain | 74/424.6 |

Primary Examiner—Leonard H. Gerin
Attorney—Sughrue, Rothwell, Mion, Zinn & MacPeak ABSTRACT: Hoisting or stretching device for chains provided with a guiding groove for the chain and a turnable worm screw in close connection to said groove and in engagement with one or more links of the chain so as to move the chain axially.

PATENTED OCT 12 1971 3,611,825

INVENTOR.

BY

DRIVING DEVICE FOR CHAINS

The present invention relates to a device for applying on chains a hoisting, tightening, stretching or other driving power.

Such chain driving devices have a great field of use.

In pulley blocks it is earlier known to utilize a chain running over a chain wheel with a wheel center having a radial groove for the upright links of the chain and/or axially directed recesses for the lying links of the chain. Furthermore, chain wheels for driving chains are well known, said wheel having projections meshing between or in the links. The chain wheel is driven in any prior known manner, for instance by means of a cogwheel gearing, a worm gear or the like. The power transmission to the chain is made possible by having the chain wheel formed to fit the chain.

Another prior art method to hoist a chain is utilized for instance in a windlass where the anchor chain with one of its ends is connected to a winch drum and is hoisted on the same by rotating the winch drum.

By the connecting and stretching of two chains it is furthermore known to use lever-operated tensioning devices for timber logs or the like devices, where the stretching is carried out from one link to another, during which operation a certain adjustment of the stretching steps can be made by having the lever fixed and locked more or less close to one of the chains. If any large chain lengths are to be pulled, however, such a lever-operated tensioning device is too slow and too unpractical.

Finally there are stretching screws utilized for the stretching of chains. The effective working length is, however, very limited. By making fast, for instance timber logs, stretching screws will often lie close to the load and can be bent and are no longer useful. If, in such cases, one aims to avoid bending the screw, the screw must not be stretched too far which as a rule is not satisfactory.

It is an object of the present invention to produce a new and improved device, which can be used for the stretching, tightening or pulling or the like of chains and which is easier to utilize than hitherto known devices, and in certain applications superior to prior art devices. The working length is unlimited and the device will work rapidly, stepless and make it possible to lock the device in any desired position. A further desire is that the device shall be suitable for a modification for different fields of use and also be possible to use for applying great forces on chains.

The advantages of the invention are gained by arranging a guiding means with a guiding groove or the like for the chain as well as a worm screw turnable around its supporting axle and suitably being supported in close connection to said guiding means, which worm screw is arranged to act upon one or more of the links of the chain close to the guide means so that the chain is driven substantially in the length direction of the worm screw during its turning.

The shape of the profile of said guiding groove and the worm screw are made for a great number of chains now on the market. The device does not require the use any calibrated chain or a chain manufactured specially for the purpose, but instead of this a common commercial product may be used. The same device may also be used for wires equipped with regularly appearing balls, so called talurites. These may, if found necessary, be equipped with wear washers which rotate on said balls and thus reduce wear on the worm screw.

If at a given pitch the angle of climb of the worm gear is chosen sufficiently small, the device will become self-locking. Especially at chains with long links this will, however, lead to a great diameter of the worm screw and accordingly a high weight and greater need for space. According to a further development of the invention this can be eliminated by a separate brake or lock device for said worm screw preventing its rotating. The worm screw may then be made with a smaller diameter and greater angle of climb. Such a locking device may for instance consist of one or more brake shoes which can be pressed against the worm spindle.

The insertion of the chain into the device is essentially facilitated if the guiding means according to an embodiment of the invention is made swingable outwards.

In certain cases it can be useful to stretch, pull or the like two chains at the same time. It may also be suitable in some cases to use two somewhat different chains for the same purpose or at the same time, and if so, for instance, one of the chains is somewhat heavier than the other while the length of the link is the same or nearly the same. Such requirements are met by a further development of the invention object by which two guiding means for the chains in question are arranged at one and the same worm screw.

The chain-driving device according to the invention may be a manual turning of the worm screw. At greater pulling lengths or when there are special demands, it may, accordingly to an embodiment of the invention, be suitable to connect the worm to a motor-driving device. This driving device may in accordance with the existing demands be an electric motor, an internal combustion engine, a steam motor, a hydraulic motor or a pneumatic motor. The motor may be equipped with speed control means, be reversible, and if desired also be breaking.

Figure 2:
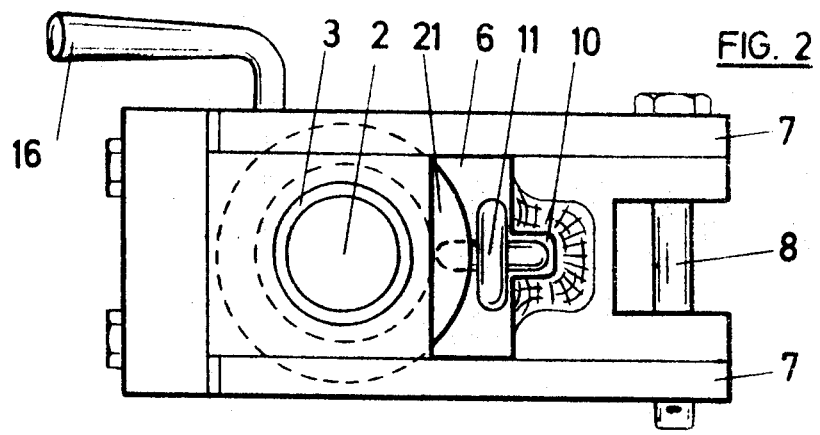

The invention will now be closer described with reference to an embodiment illustrated on the accompanying drawings, in which FIG. 1 shows a side view of a chain-driving device according to the invention with a manual rotatable worm gear, and FIG. 2 shows a view from below of the same device.

In the embodiment illustrated in the drawing figures the chain-driving device is equipped with a worm screw 1, the lower pivot end 2 of which is supported in a bushing 3 of suitable material in so called self-lubricating performance. In heavier embodiments thrust bearings in the form of roller bearings be most useful. The bushing 3 is arranged in a baseplate 4, which is fastened to a worm gear support 5 by means of two bolts. In the baseplate 4 an aperture 6 is situated between two plate legs 7, the free ends of which are equipped with a hole. Through the two holes is a bolt 8. The bolt is locked by means of a peg pin in said hole.

In the aperture 6 is a guiding means 9 with a guiding groove 10. Said guiding groove 10 is here given a substantial rectangular cross section and receives only every second link of the chain. The guiding groove may of course also be made in another manner, for instance with a T-shaped cross section and can then receive upright as well as lying links.

The guiding groove 10 is diverging at the upper and lower rounded ends of the guiding means 9 and is suitably smoothly rounded in a curve towards right in FIG. 1. The chain 11 is conveyed through the remaining part of the aperture 6 between the guiding means 9 and the plate 4, upwardly through the guiding groove along the worm gear 1 through an upper aperture 12 in the worm gear support 5.

The upper part of the worm gear support 5 is equipped with a boring for the upper pivot end 13 of the worm gear 1, the latter being equipped with an aperture for the receipt of a non-described device—for instance a lever for the turning of the worm gear. At right angles to the shaft of the worm gear is a further boring in the upper part of the worm gear support 5 for the receipt of a merely schematically suggested device 15 for the locking of the worm gear in an arbitrary turning position of same. This device may for instance be made so that by turning of the lever 16 of said device a brake block is pressed against the upper pivot end 13 of the worm gear 1 thus braking or locking the same.

Just as was the case for the baseplate 4, the upper part of the worm gear support 5 is equipped with an upper aperture 12, in which is inserted the upper end of the guiding means 9 held in position by means of an upper bolt 17. The bolt 17 may rather easily be taken away from the legs 18 of the worm gear support but is nevertheless firmly held in its position—here by means of an easily detachable peg pin 20 which prevents an unintended detaching of same. The upper part of the worm gear support may furthermore be equipped with a loop, boring 19 or a similar means for the purpose of fastening or the like.

The screw threads 21 of the worm gear have a pitch which is less than the real length of two chain links. More precisely the pitch may not be greater than the double link length minus four times the thickness of the link. The screw threads 21 should initially be smoothly bent and continue likewise smoothly towards the core diameter of the worm gear.

The worm gear 1 is illustrated in the drawing figure with only one thread. It may, however, be made double-threaded with two inlets. This is especially suitable for short links and with respect hereto for a large diameter of the worm gear and when applying especially heavy forces on the chain. Each thread should suitably be extended somewhat longer around the core of the worm gear than one turn (1/2 turn for a double-threaded gear).

Due to the fact that the worm gear acts directly on the links of the chain, a very easy construction is obtained and as furthermore a motor-driving device may be connected directly to the worm gear. Expensive cog boxes or the like can be eliminated. A surface hardening of either the whole worm gear surface or possibly only the threads of same will be sufficient.

The invention gives the designer a new machine element which can be used in different manners and in a great number of different embodiments. The invention is also convenient for use for instance as a stretching device for the lashing of cargo in and on ships and railway cars etc. One or more chains to be stretched by means of the invention can be stretched without stepping and with locking in every arbitrary degree of stretching. The invention may furthermore be made and used as a capstan on board ships, for the conveyance of a ship or a vehicle by pulling same by means of a chain, for the driving of moving aprons, for chain elevators, for hoisting or lowering of the arms of cranes, and so on.

Although the invention has been described with reference to an embodiment of the same the invention may be arbitrarily varied within the scope of the following claims.

What I claim is:

1. A device for applying an axial force to a chain in which two consecutive links are positioned in planes substantially perpendicular to each other comprising:
   a. a worm screw means having an axis parallel to the axis of said chain for directly driving said chain in an axial direction;
   b. a support means for supporting said worm screw means;
   c. guide means mounted on said support means, for guiding the links of said chain in a plane parallel to the surface of said guide means, said guide means including a guide groove for guiding the links of said chain in a plane perpendicular to said surface; and
   d. wherein said worm screw means has a profile fitted to said links.

2. The device of claim 1 wherein the pitch angle of said worm screw means is small such that said device is self-locking.

3. The device of claim 1 further comprising locking means connected to said support means for preventing the rotation of said worm screw means.

4. The device of claim 1 wherein said guide means is swingably mounted on said support means whereby said guide means may be swung away from said worm screw means to facilitate the insertion of the chain in said device.

5. The device of claim 4 further comprising a second guide means for said chain.